(12) United States Patent
Adachi

(10) Patent No.: US 8,848,291 B2
(45) Date of Patent: Sep. 30, 2014

(54) FIXED FOCUS LENS

(75) Inventor: Nobuyuki Adachi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 92 days.

(21) Appl. No.: 13/345,916

(22) Filed: Jan. 9, 2012

(65) Prior Publication Data
US 2012/0229900 A1 Sep. 13, 2012

(30) Foreign Application Priority Data

Mar. 8, 2011 (JP) ................................ 2011-050781

(51) Int. Cl.
G02B 27/64 (2006.01)
G02B 9/34 (2006.01)
G02B 13/18 (2006.01)
G02B 9/64 (2006.01)

(52) U.S. Cl.
CPC ........ *G02B 13/18* (2013.01); *G02B 9/34* (2013.01); *G02B 9/64* (2013.01); *G02B 27/646* (2013.01)
USPC ............ 359/557; 359/554; 359/771; 359/773

(58) Field of Classification Search
CPC ............ G02B 9/00; G02B 9/34; G02B 13/18; G02B 15/22; G02B 27/64; G02B 27/646
USPC .................. 359/554–557, 676, 684, 771–773
See application file for complete search history.

(56) References Cited

U.S. PATENT DOCUMENTS

| | | | | |
|---|---|---|---|---|
| 5,121,978 A | * | 6/1992 | Maruyama | 359/557 |
| 5,687,401 A | * | 11/1997 | Kawamura et al. | 396/79 |
| 5,828,490 A | | 10/1998 | Sato | |
| 7,974,016 B2 | * | 7/2011 | Lai et al. | 359/773 |
| 2009/0251795 A1 | | 10/2009 | Adachi et al. | |
| 2010/0284092 A1 | * | 11/2010 | Hayakawa | 359/683 |
| 2011/0169974 A1 | | 7/2011 | Take et al. | |

FOREIGN PATENT DOCUMENTS

| | | |
|---|---|---|
| CN | 101320123 A | 12/2008 |
| JP | 64-44908 A | 2/1989 |
| JP | 9-325269 A | 12/1997 |
| JP | 2003-43348 A | 2/2003 |
| JP | 2009-122620 A | 6/2009 |
| JP | 2009-265657 A | 11/2009 |

(Continued)

OTHER PUBLICATIONS

Chinese Office Action, Dec. 13, 2013, 8 pages.

(Continued)

*Primary Examiner* — Thong Nguyen

(74) *Attorney, Agent, or Firm* — Foley & Lardner LLP

(57) ABSTRACT

A fixed focus lens includes an M group that is disposed at a center of the optical system and has a positive refractive power; an F group that is disposed farther on the image plane side than the M group, has a negative refractive power, and is moved along the optical axis during focusing; a V group that is disposed farther on the object side than the M group, has a negative refractive index, and is moved in a direction orthogonal to the optical axis during vibration control; and an FC group that is disposed farther on the object side than the V group and has a positive refractive power. The V group is configured by a single lens element, and during focusing, at least the FC group and the M group are fixed.

6 Claims, 15 Drawing Sheets

(56) References Cited

FOREIGN PATENT DOCUMENTS

| JP | 2010-72276 A | 4/2010 |
| JP | 2010-145759 A | 7/2010 |
| JP | 2010-271458 A | 12/2010 |
| WO | WO 2010/032358 A1 | 3/2010 |

OTHER PUBLICATIONS

Chinese Office Action, Jun. 12, 2014, 10 pages.
Japanese Office Action, May 27, 2014, 6 pages.

* cited by examiner

FIXED FOCUS LENS

BACKGROUND OF THE INVENTION

1. Field of the Invention

The present invention relates to a fixed focus lens suitable having a vibration control function and for 35 mm cameras, video cameras, electronic still cameras, and the like.

2. Description of the Related Art

Single lens reflex cameras have a mechanism to make a captured image and the viewfinder image coincide. The mechanism uses a mirror disposed just in front of the film to reflect light transmitted by the imaging lens and thereby guides the light to the optical viewfinder. Consequently, fixed focus lenses used in single lens reflex cameras require a long back focus, limiting the degree of freedom in terms of design. On the other hand, digital cameras can realize an equivalent operation by merely displaying on an electronic display, the image captured by the image sensor. Consequently, "mirrorless single-lens cameras" have appeared that realize a smaller apparatus size since the optical view finder and mirror for guiding the captured image thereto are omitted. Mirrorless single-lens cameras further offer the advantage of increased degree of freedom in terms of fixed focus lens design since the back focus of the imaging lens can be reduced. Accordingly, a great number of fixed focus lenses applicable to mirrorless single-lens cameras are available (see, for example, Japanese Patent Application Laid-Open Publication Nos. H9-325269, 2003-43348, and 2010-72276).

The optical system disclose in Japanese Patent Application Laid-Open Publication No. H9-325269 includes an internal focusing group and vibration control group. To facilitate powered movement of the internal focusing group and the vibration control group, preferably, the internal focusing group and the vibration control group should be configured by members of a relatively small diameter compared to other optical system members. However, since the focusing group is configured by 3 or so lenses and the vibration control group is configured by 2 or so lenses, sufficient reduction of the weight of the groups is prohibited, arising in the problems of increased load on the lens driving mechanism and increased power consumption.

Similar to the optical system disclosed in Japanese Patent Application Laid-Open Publication No. H9-325269, the optical system disclosed in Japanese Patent Application Laid-Open Publication No. 2003-43348 also includes a focusing group and a vibration control group. The focusing group in the optical system disclosed in Japanese Patent Application Laid-Open Publication No. 2003-43348 is configured by 2 or so lenses and thus, has a simpler, more desirable configuration than the optical system disclosed in Japanese Patent Application Laid-Open Publication No. H9-325269. Nonetheless, since the vibration control group is disposed near the image plane, movement of the vibration control group in a direction orthogonal to the optical axis of the vibration control group can easily become significant. To prevent this problem, the back focus has to be increased, which causes the overall length of the optical system to increase and thus, is undesirable.

The optical system disclosed in Japanese Patent Application Laid-Open Publication No. 2010-72276 includes within the optical system, a focusing group and a vibration control group, where a portion of the focusing group further functions as the vibration control group. This optical system has a desirable configuration that enables reduction of the overall length of the optical system. However, during focusing, since multiple lenses, the actuator of the vibration control group, and mechanical components are collectively moved, accurate termination of the movement is difficult to maintain. Furthermore, a large actuator for the vibration control group is necessary, arising in the problems of increased power consumption and increased lens barrel size.

SUMMARY OF THE INVENTION

It is an object of the present invention to at least solve the above problems in the conventional technologies.

According to one aspect of the invention, a fixed focus lens includes an M group that is disposed at a center of the optical system and has a positive refractive power; an F group that is disposed farther on the image plane side than the M group, has a negative refractive power, and is moved along the optical axis during focusing; a V group that is disposed farther on the object side than the M group, has a negative refractive index, and is moved in a direction orthogonal to the optical axis during vibration control; and an FC group that is disposed farther on the object side than the V group and has a positive refractive power. The V group is configured by a single lens element, and during focusing, at least the FC group and the M group are fixed.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
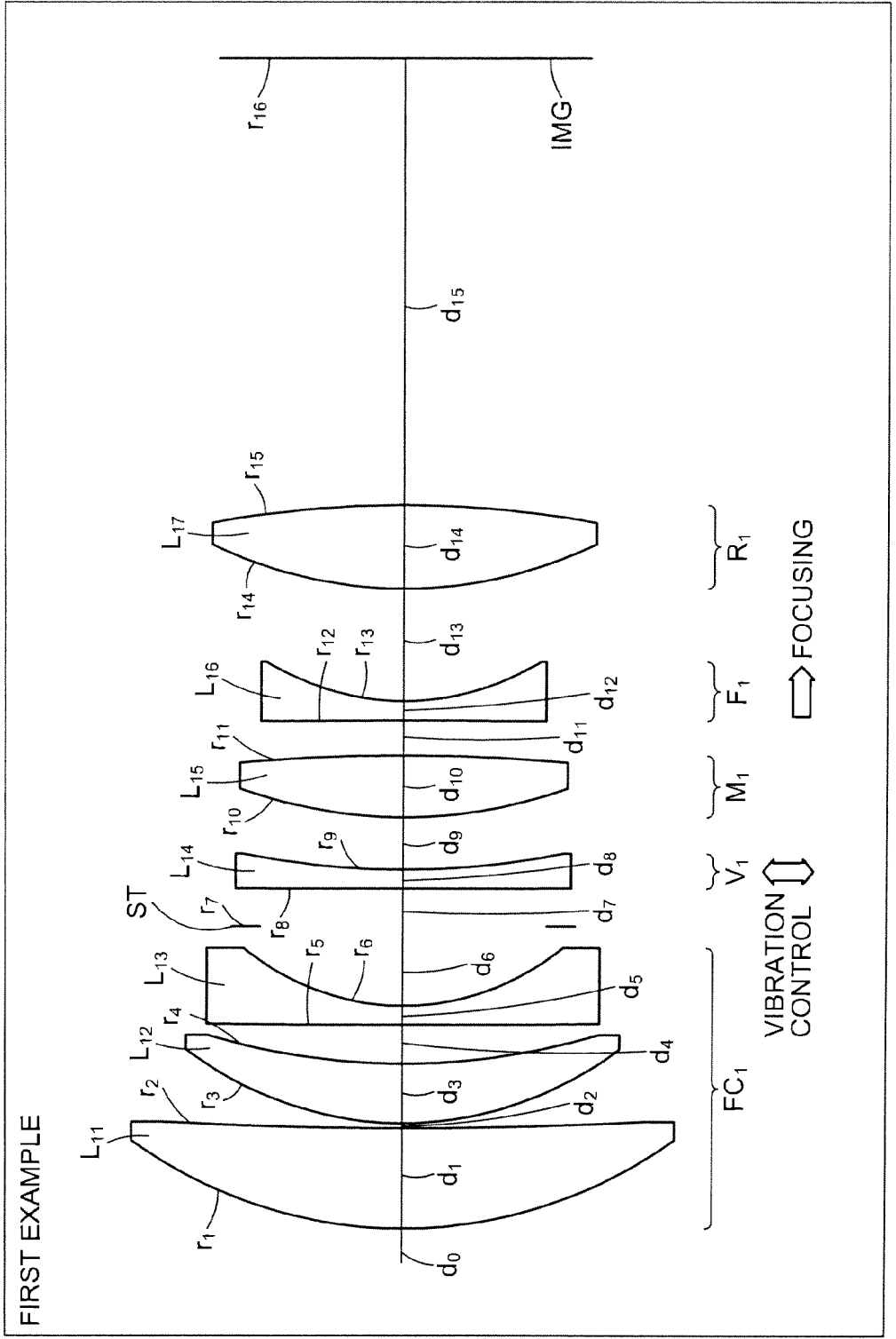
FIG. 1 is a cross sectional view (along the optical axis) of a fixed focus lens according to a first example.

Referring to the accompanying drawings, exemplary embodiments of a fixed focus lens according to the present invention are explained in detail below.

A fixed focus lens according to the present invention includes centrally in the optical system, a master (M) group that has a positive refractive power, a focusing (F) group that is disposed farther on the image plane side of the fixed focus lens than the M group and that has a negative refractive power, a vibration control (V) group that is disposed farther on the object side of the fixed focus lens than the M group and that has a negative refractive power, and a front component (FC) group that is disposed farther on the object side of the fixed focus lens than the V group and that has a positive refractive power.

In the fixed focus lens, the M group, which has a positive refractive power, is sandwiched by lens groups respectively having a negative refractive power, where the lens group on the object side of the fixed focus lens performs the function of vibration control and the lens group on the image plane side of the fixed focus lens performs the function of focusing.

The V group moves in a direction orthogonal to the optical axis, whereby vibration control is performed. Thus, consideration must be given to reducing the weight of the V group to increase the termination accuracy during vibration correction and to reduce the outer diameter of the lens barrel supporting the optical system. To satisfy these requirements, in the fixed focus lens according to the present invention, the V group is configured by a single lens element and is disposed in an area where the optical beam diameter in the optical system becomes relatively small. Single lens elements include ground lenses, aspheric lenses, compound aspheric lenses, and cemented lenses; and do not include lenses that are not attached to one another with a gap therebetween, such as 2 positive lenses.

In addition, the V group is preferably of a configuration that causes minimal aberration during vibration correction. Thus, in the present invention, the V group is disposed at a position away from the image plane (at a position farther on the object side of the fixed focus lens than the M group), whereby paraxial magnification is increased and vibration correction can be performed by little movement of the vibration control group. Whereas, if the V group is disposed farther on the image plane side of the fixed focus lens than the M group, in addition to imaging performance deteriorating, the outer diameter of the lens barrel increases.

If the vibration control group is disposed near the image plane as with conventional technologies, the distance that the vibration control group is moved during vibration correction becomes great, or the off-axis optical beam is transmitted at a position higher than the optical axis, whereby the diameter and the weight of the vibration control group increase and consequently, termination accuracy of the vibration control group deteriorates, which is undesirable. Further, with the conventional technologies, if imaging magnification is increased to reduce the diameter of the vibration control group and to reduce the distance that the vibration control group is moved during vibration correction, the back focus increases, arising in a problem of the overall length of the optical system increasing. In light of these points, the advantages of the present invention are obvious.

The F group is moved along the optical axis to perform focusing. In the present invention, to implement a compact fixed focus lens as an entire optical system, the F group is disposed farther on the image plane side of the fixed focus lens than the M group, which has a positive refractive power. Whereas, if the F group, which is responsible for focusing, is disposed farther on the object side than the M group, the overall optical length has to be increased to establish the focus stroke of the F group. If the F group has a suitable magnification and is disposed on the image plane side of the fixed focus lens, the space between the lens and the image sensor can be reduced, enabling realization of a compact optical system. The M group is fixed.

Close range variation of aberration primarily occurs in the FC group because within the optical system, the transmission position of the FC group changes the most consequent to changes in the object distance. Thus, with consideration of suppressing aberration variation, in the present invention, the FC group includes sequentially from the object side, a positive lens, a positive lens, and a negative lens. The FC group is also fixed.

To control deterioration of imaging performance during vibration correction, at least one surface of the single lens element configuring the V group is aspheric. Furthermore, the aspheric surface is preferably configured such that convergence increases toward the periphery from an optical axial center. In the fixed focus lens according to the present invention, at least one of the surfaces of the single lens element configuring the V group is an aspheric surface configured such that that convergence increases toward the periphery from an optical axial center. The fixed focus lens preferably satisfies the following conditional expression, where ΔH is the depth which makes the starting point the optical axis in the effective radius of the direction of an optical axis. The depth means the difference of the case where the appointed side is an aspherical surface, and the case where an aspherical surface coefficient is set to 0.

$$0.04 \leq 1000 \times (\Delta H/f) \leq 0.5 \quad (1)$$

Conditional expression (1) prescribes the shape of the aspheric surface of the V group. By satisfying conditional expression (1), the fixed focus lens can improve imaging performance without sacrifice to reductions in the size of the optical system. Below the lower limit of conditional expression (1), the variation of the aspheric surface becomes too small, making spherical aberration that occurs within the FC group consequent to convergence beyond the focal length difficult to correct. To perform this correction, the number of lenses disposed in the optical system has to be increased, making reduction of the size of the optical system impossible. On the other hand, above the upper limit of conditional expression (1), the variation of the aspheric surface becomes too great, whereby spherical aberration becomes overcorrected, or coma becomes prominent and the maintenance of imaging performance during vibration correction becomes difficult.

If conditional expression (1) is within the following range, more favorable results can be expected.

$$0.05 \leq 1000 \times (\Delta H/f) \leq 0.45 \quad (1)'$$

Within the range prescribed by conditional expression (1)', imaging performance can be further improved.

If conditional expression (1)' is within the following range, more favorable results can be expected.

$$0.06 \leq 1000 \times (\Delta H/f) \leq 0.4 \quad (1)''$$

Within the range prescribed by conditional expression (1)", imaging performance can be further improved.

The fixed focus lens according to the present invention preferably satisfies the following conditional expression, where fV is the focal length of the V group and fF is the focal length of the F group.

$$1.5 \leq fV/fF \leq 6.2 \quad (2)$$

Conditional expression (2) prescribes a ratio of the focal length of the V group and the focal length of the F group. Below the lower limit of conditional expression (2), the focal length of the V group becomes too short with respect to the focal length of the F group, or the focal length of the F group becomes too long with respect to the focal length of the V group. If the focal length of the V group becomes too short with respect to the focal length of the F group, aberration variation during vibration correction increases. To address this problem, the number of lenses configuring the V group has to be increased, which makes reduction in the weight of the V group difficult and increases the overall length of the optical system. On the other hand, if the focal length of the F group is too long with respect to the focal length of the V group, the focus stroke of the F group increases as does the overall length of the optical system and consequently, reduction of the size of the optical system becomes difficult. On the contrary, above the upper limit of conditional expression (2), the focal length of the V group becomes too long with respect to the focal length of the F group, or the focal length of the F group becomes too short with respect to the focal length of the V group. If the focal length of the V group becomes too long with respect to the focal length of the F group, from the perspective of vibration correction, such a state is favorable, however, the distance that the V group has to be moved for vibration correction increases, which is detrimental to reducing the size of the optical system. On the other hand, if the focal length of the F group becomes too short with respect to the focal length of the V group, aberration variation increases during focusing and thus, is undesirable.

If conditional expression (2) is within the following range, more favorable results can be expected.

$$1.6 \leq fV/fF \leq 6.0 \quad (2)'$$

Within the range prescribed by conditional expression (2)', reduction of the overall length of the optical system can be achieved and imaging performance can be further improved.

If conditional expression (2)' is within the following range, more favorable results can be expected.

$$1.7 \leq fV/fF \leq 5.8 \quad (2)''$$

Within the range prescribed by conditional expression (2)", further reduction of the overall length of the optical system can be achieved and imaging performance can be further improved.

In the fixed focus lens according to the present invention, the F group is preferably lightweight. When the actuator of the F group responsible for focusing is operated at high speed, high accuracy of the termination position is demanded. Consequently, it is highly desirable for the F group to be lightweight. Thus, in the present invention, the F group is configured by a single lens element. In this manner, reduction of the weight of the F group is facilitated. The single lens element may be a ground lens, an aspheric lens, a compound aspheric lens, or a cemented lens; and may not be lenses that are not attached to one another and that have a gap therebetween, such as 2 positive lenses. The single lens element configuring the F group has a suitable shape (e.g., aspheric shape) such that aberration variation during focusing can be suppressed.

The fixed focus lens according the present invention preferably satisfies the following conditional expression, where βinf is the paraxial magnification of the F group, at infinity focus and β mod is the paraxial magnification of the F group, at the focus state for the minimum object distance.

$$0.8 \leq \beta inf/\beta mod \leq 7.0 \quad (3)$$

Conditional expression (3) prescribes a ratio of the paraxial transverse magnifications of the F group at infinity focus and at the focus state for the minimum object distance. By satisfying conditional expression (3), the fixed focus lens can maintain high imaging performance while establishing a short minimum imaging distance. Below the lower limit of conditional expression (3), the minimum imaging distance become too great, an unattractive specification for a lens. On the other hand, above the upper limit of conditional expression (3), although a decrease of the minimum imaging distance is desirable, the overall focal length of the lenses disposed farther on the object side than the F group decreases, arising in a problem that distortion and chromatic difference of magnification become prominent.

If conditional expression (3) is within the following range, more favorable results can be expected.

$$0.9 \leq \beta inf/\beta mod \leq 6.8 \quad (3)'$$

Within the range prescribed by conditional expression (3)', high optical performance can be maintained while a short minimum imaging distance can be established.

If conditional expression (3)' is within the following range, more favorable results can be expected.

$$1.0 \leq \beta inf/\beta mod \leq 6.5 \quad (3)''$$

Within the range prescribed by conditional expression (3)', high imaging performance can be maintained while a short minimum imaging distance can be established.

The fixed focus lens according to the present invention preferably satisfies the following conditional expression, where fM is the focal length of the M group and f is the overall focal length of the optical system.

$$0.36 \leq fM/f \leq 0.77 \quad (4)$$

Conditional expression (4) prescribes the focal length of the M group sandwiched by the V group and the F group, which have a negative refractive power. By satisfying conditional expression (4), the fixed focus lens has a lightweight V group and F group, and can further achieve a compact size and maintain high imaging performance. Below the lower limit of conditional expression (4), the correction of spherical aberration and coma occurring at the M group becomes difficult. To suitably correct such aberration, more lenses have to be added to the optical system, which is undesirable since the length of the optical system increases. On the other hand, above the upper limit of conditional expression (4), the imaging magnification of the F group and the V group become too small. As a result, the focus stroke of the F group increases and the correction of spherical aberration becomes difficult. Further, the distance that the V group has to move during vibration correction increases. As a result, imaging performance deteriorates and the size of the optical system increases, which are undesirable consequences.

If conditional expression (4) is within the following range, more favorable results can be expected.

$$0.38 \leq fM/f \leq 0.75 \quad (4)'$$

Within the range prescribed by conditional expression (4)', reduction of the size of the optical system and maintenance of high imaging performance can be facilitated.

If conditional expression (4)' is within the following range, more favorable results can be expected.

$$0.40 \leq fM/f \leq 0.70 \quad (4)''$$

Within the range prescribed by conditional expression (4)'', reduction of the size of the optical system and maintenance of high imaging performance can be facilitated.

As described, according to the present invention, a compact, fixed focus lens having a lightweight focusing group and vibration control group as well as high imaging performance is realized. In particular, by satisfying the conditional expressions above, a fixed focus lens that is more compact and has excellent imaging performance is realized.

With reference to the accompanying drawings, examples of the fixed focus lens according to the present invention will be described in detail.

FIG. 1 is a cross sectional view (along the optical axis) of the fixed focus lens according to a first example. The fixed focus lens includes a master group $M_1$ that has a positive refractive power, a focusing group $F_1$ that is disposed closer to an image plane IMG than the master group $M_1$ and that has a negative refractive power, a vibration control group $V_1$ that is disposed closer to an object (not depicted) than the master group $M_1$ and that has a negative refractive power, a front component group $FC_1$ that is disposed closer to the object than the vibration control group $V_1$ and that has a positive refractive power, and a rear group $R_1$ that is disposed closer to the image plane IMG than the focusing group $F_1$ and that has a positive refractive power. An aperture stop ST, which prescribes a given aperture, is disposed between the front component group $FC_1$ and the vibration control group $V_1$.

The front component group $FC_1$ includes sequentially from the side nearest the object (object side), a positive lens $L_{11}$, a positive lens $L_{12}$, and a negative lens $L_{13}$. The front component group $FC_1$ is fixed and does not move during focusing.

The vibration control group $V_1$ is configured by a negative lens $L_{14}$. The surface on the object side of the negative lens $L_{14}$ is aspheric and configured such that that convergence increases toward the periphery from an optical axial center. The vibration control group $V_1$ moves in a direction orthogonal to the optical axis, whereby vibration control is performed. The vibration control group $V_1$ does not move along the optical axis during focusing.

The master group $M_1$ is configured by a positive lens $L_{15}$. The master group $M_1$ is fixed and does not move during focusing.

The focusing group $F_1$ is configured by a negative lens $L_{16}$. The surface on the image plane IMG side of the negative lens $L_{16}$ is aspheric. The focusing group $F_1$ moves along the optical axis, from the object side toward the image plane IMG, whereby focusing from infinity focus to focus at the minimum object distance is performed.

The rear group $R_1$ is configured by a positive lens $L_{17}$.

Various values related to the fixed focus lens according to the first example are given below.

(Lens data)

| | | | |
|---|---|---|---|
| $r_0 = \infty$ (object surface) | $d_0 = D(0)$ | | |
| $r_1 = 23.2195$ | $d_1 = 4.2187$ | $nd_1 = 1.88300$ | $\nu d_1 = 40.80$ |
| $r_2 = 218.6326$ | $d_2 = 0.2000$ | | |
| $r_3 = 17.8357$ | $d_3 = 2.5171$ | $nd_2 = 1.72916$ | $\nu d_2 = 54.67$ |
| $r_4 = 35.0752$ | $d_4 = 1.6078$ | | |
| $r_5 = 682.8697$ | $d_5 = 0.8000$ | $nd_3 = 1.80518$ | $\nu d_3 = 25.46$ |
| $r_6 = 12.5389$ | $d_6 = 3.3173$ | | |
| $r_7 = \infty$ (aperture stop) | $d_7 = 1.6000$ | | |
| $r_8 = 6515.1623$ (aspheric surface) | $d_8 = 0.8000$ | $nd_4 = 1.68893$ | $\nu d_4 = 31.16$ |
| $r_9 = 41.1339$ | $d_9 = 2.2089$ | | |
| $r_{10} = 24.4278$ | $d_{10} = 2.6031$ | $nd_5 = 1.91082$ | $\nu d_5 = 35.25$ |
| $r_{11} = -97.6653$ | $d_{11} = D(11)$ | | |
| $r_{12} = -391.4081$ | $d_{12} = 0.8000$ | $nd_6 = 1.56732$ | $\nu d_6 = 42.84$ |
| $r_{13} = 12.6866$ (aspheric surface) | $d_{13} = D(13)$ | | |
| $r_{14} = 21.8411$ | $d_{14} = 3.5520$ | $nd_7 = 1.62041$ | $\nu d_7 = 60.34$ |
| $r_{15} = -51.1087$ | $d_{15} = FB$ | | |
| $r_{16} = \infty$ (image plane) | | | |

(Constant of cone (k) and aspheric coefficients ($A_4, A_6, A_8, A_{10}$))

(Eighth plane)

$k = 0$,
$A_4 = 1.31522 \times 10^{-6}, A_6 = 4.08403 \times 10^{-8}$,
$A_8 = 3.73283 \times 10^{-10}, A_{10} = 2.41864 \times 10^{-12}$ (Thirteenth plane)

$k = 0$,
$A_4 = -2.17308 \times 10^{-5}, A_6 = -3.37294 \times 10^{-7}$,
$A_8 = 4.64174 \times 10^{-9}, A_{10} = -6.19872 \times 10^{-11}$ (Values for various focus states)

| | Infinity | 0.025x | Minimum Object Distance |
|---|---|---|---|
| Focal length of entire system (f) | 40.00 | 39.84 | 38.72 |
| F no. | 2.00 | 2.00 | 2.20 |
| Half angle of view (ω) | 12.1 | 11.8 | 10.8 |
| D(0) (object to image distance) | ∞ | 1617.7 | 100.0 |
| D(11) | 1.500 | 2.225 | 4.573 |
| D(13) | 4.773 | 4.048 | 1.700 |
| FB (back focus) | 18.848 | 18.848 | 18.848 |

(Values related to conditional expression (1))
ΔH (variation of the aspheric surface of vibration control group V1 from a base spherical curve, where the variation is at a point along the perimeter of the effective area demarcated by effective radius (6.992) of aspheric surface and assumed to be positive in the direction of the image plane side)=(0.0108)

$$1000 \times (\Delta H/f) = 0.27$$

(Values related to conditional expression (2))
fV (focal length of vibration control group $V_1$)=−60.089
fF (focal length of focusing group $F_1$)=−21.645
fV/fF=2.78
(Values related to conditional expression (3))
βinf (paraxial magnification of focusing group $F_1$, at infinity focus)=6.060
βmod (paraxial magnification of focusing group $F_1$, at minimum object distance focus)=3.258
βinf/βmod=1.86
(Values related to conditional expression (4))
fM (focal length of master group $M_1$)=(21.674)
fM/f=0.54

Figure 2:
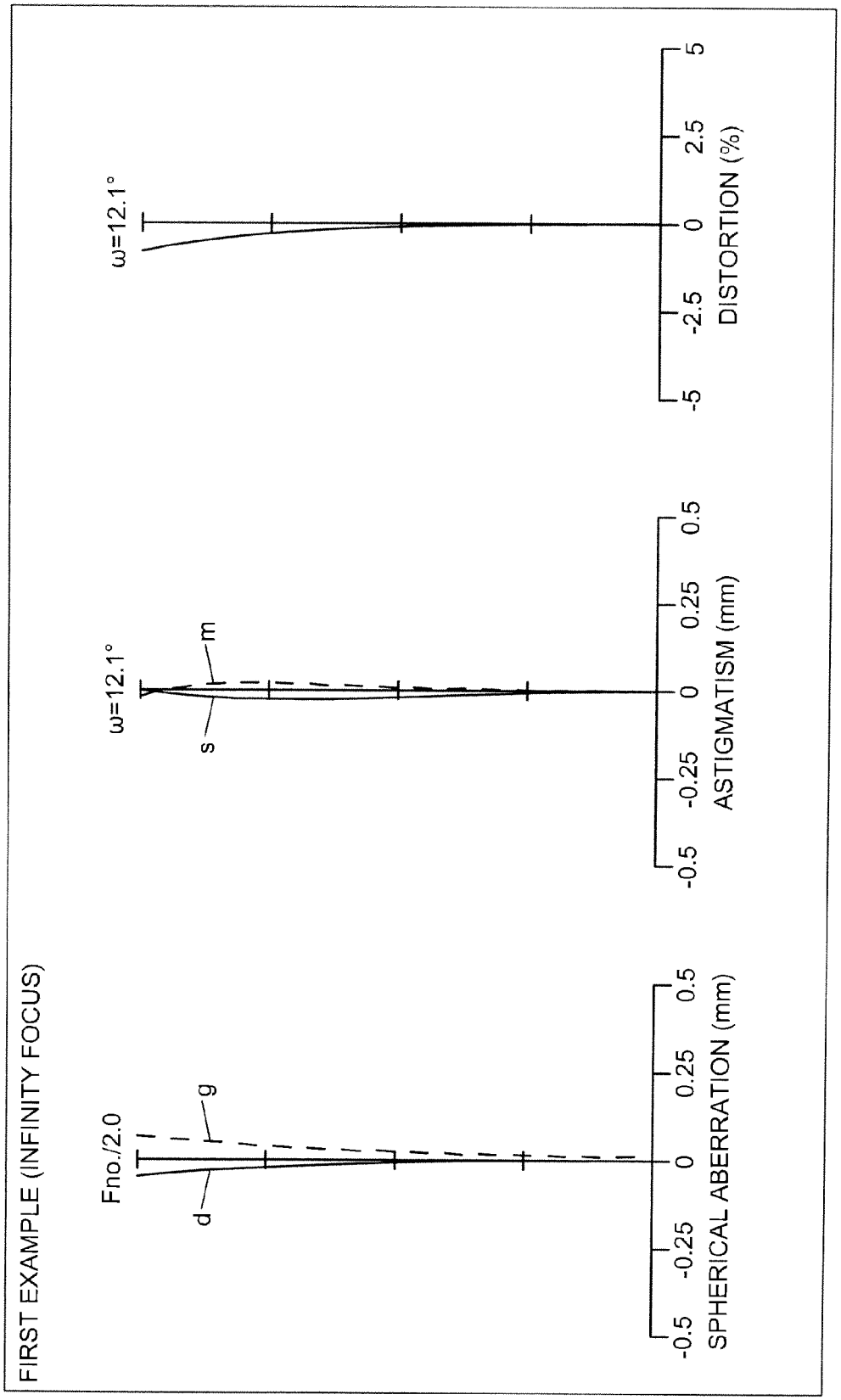
FIG. 2 is a diagram of various types of aberration of the fixed focus lens according to the first example, at infinity focus.
Figure 3:
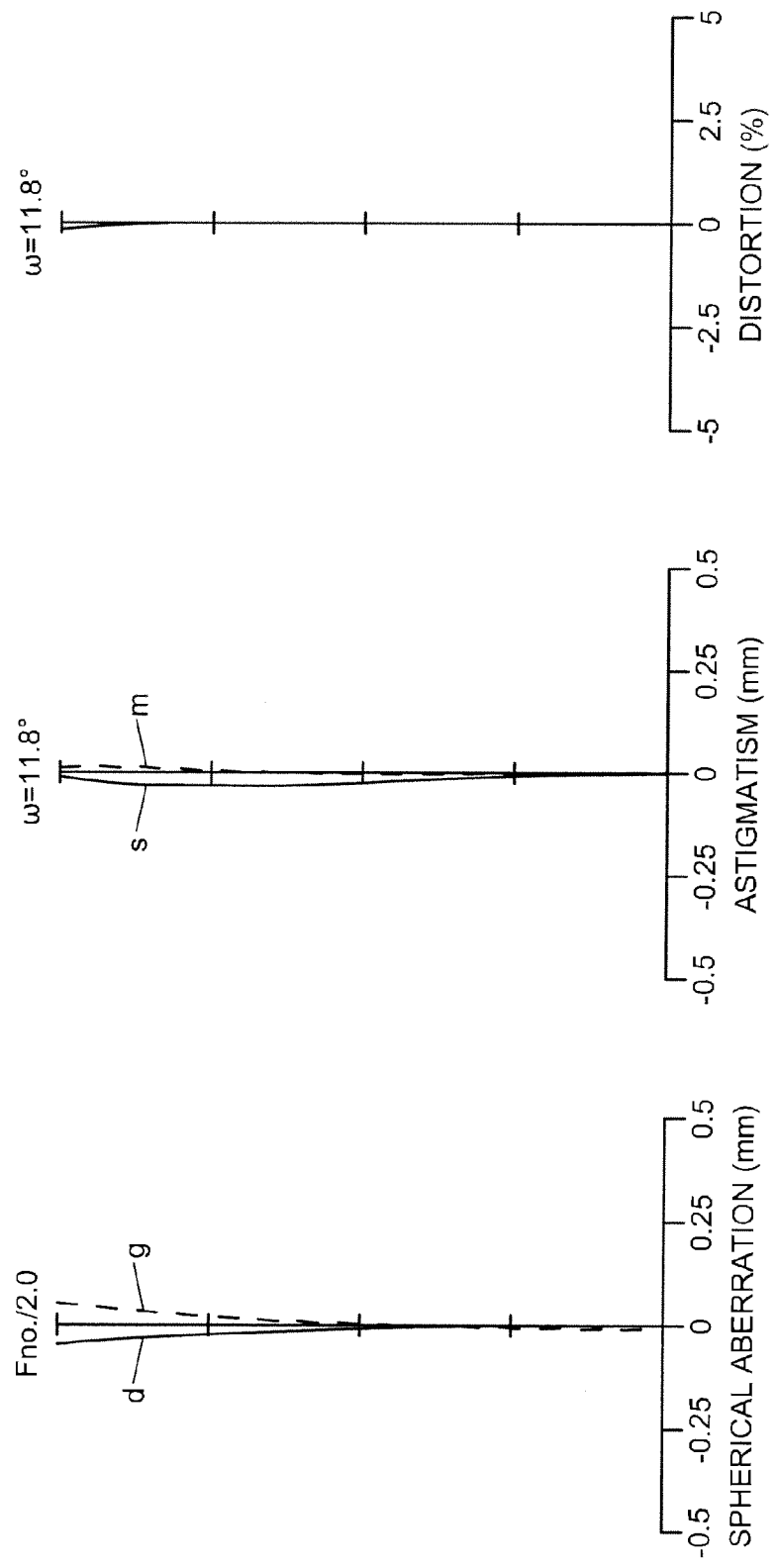
FIG. 3 is a diagram of various types of aberration of the fixed focus lens according to the first example, at the focus state for a magnification of 0.025×.
Figure 4:
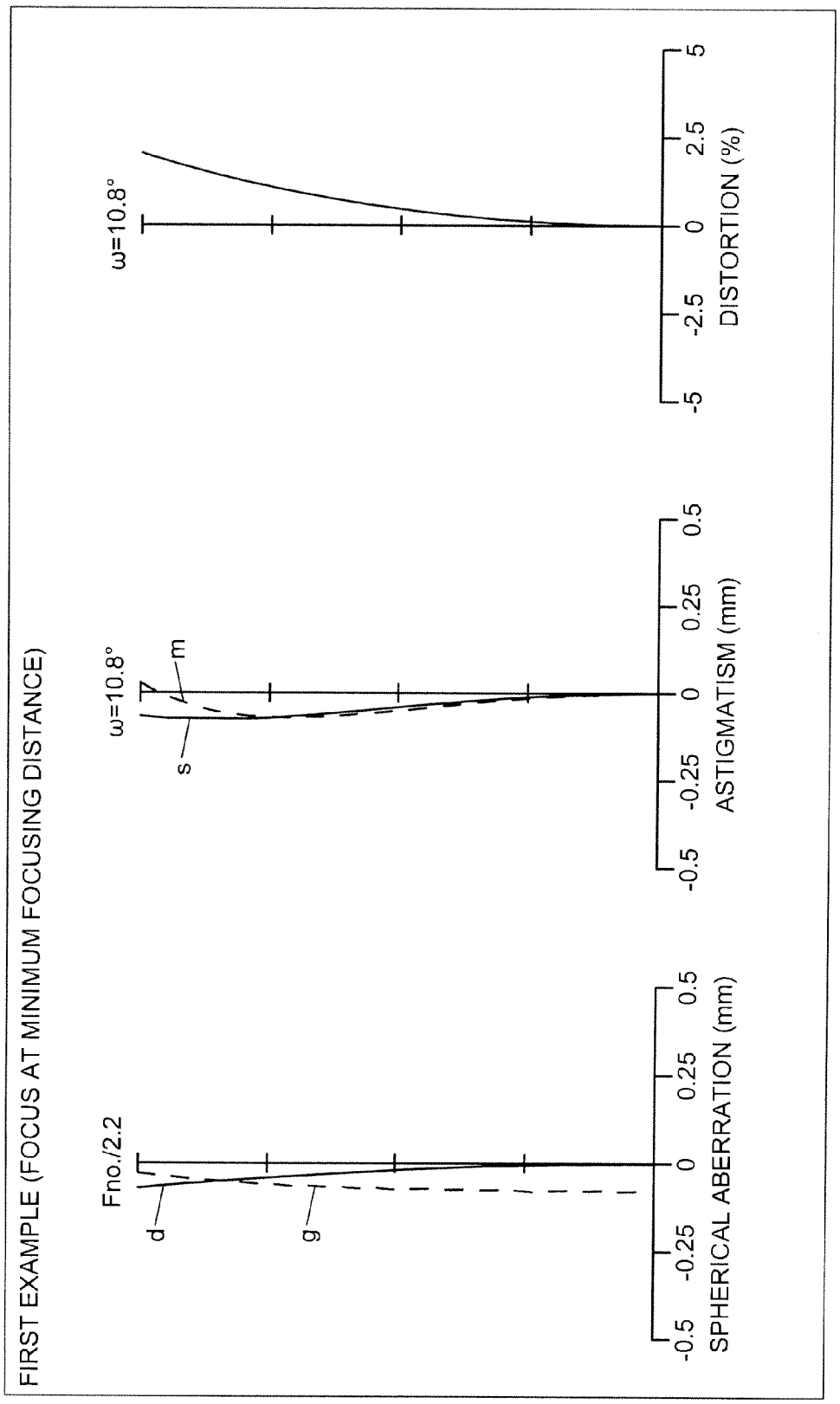
FIG. 4 is a diagram of various types of aberration of the fixed focus lens according to the first example, at the focus state for the minimum object distance.
Figure 5:
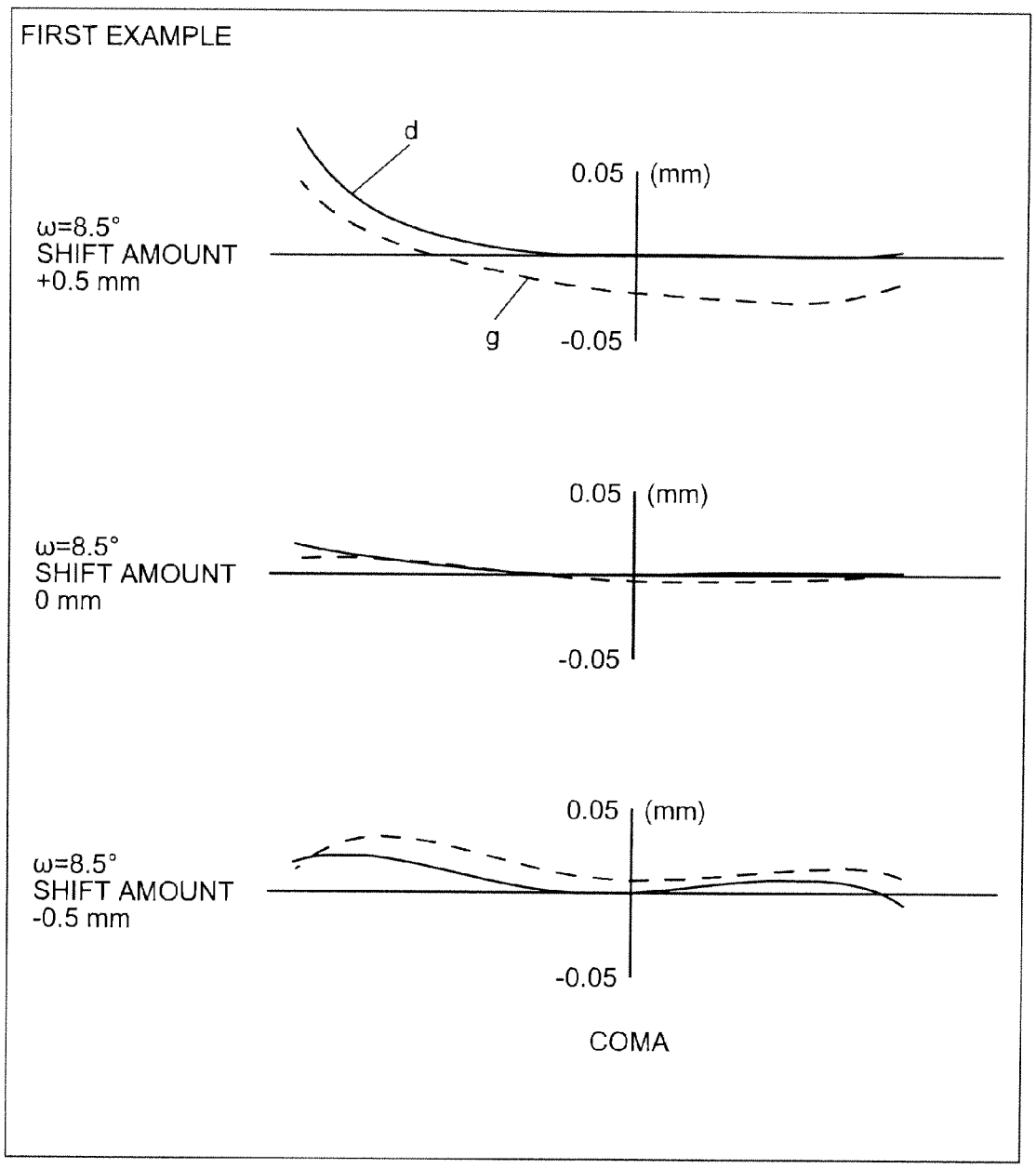
FIG. 5 is a diagram of coma of the fixed focus lens according to the first example, at various shift states of the vibration control group $V_1$.

FIG. 2 is a diagram of various types of aberration of the fixed focus lens according to the first example, at infinity focus. FIG. 3 is a diagram of various types of aberration of the fixed focus lens according to the first example, at the focus state for a magnification of 0.025x. FIG. 4 is a diagram of various types of aberration of the fixed focus lens according to the first example, at the focus state for the minimum object distance. FIG. 5 is a diagram of coma of the fixed focus lens according to the first example, at various shift states of the vibration control group $V_1$. In the drawing, g depicts wavelength aberration corresponding to g-line ($\lambda$=435.83 nm) and d depicts wavelength aberration corresponding to d-line ($\lambda$=587.56 nm). Furthermore, in the drawing, s and m shown with respect to astigmatism, respectively indicate aberration at the sagittal image plane and at the meridonal image plane. In the diagram of coma, the shift amount is positive in the upward direction with respect to the optical axis.

Figure 6:
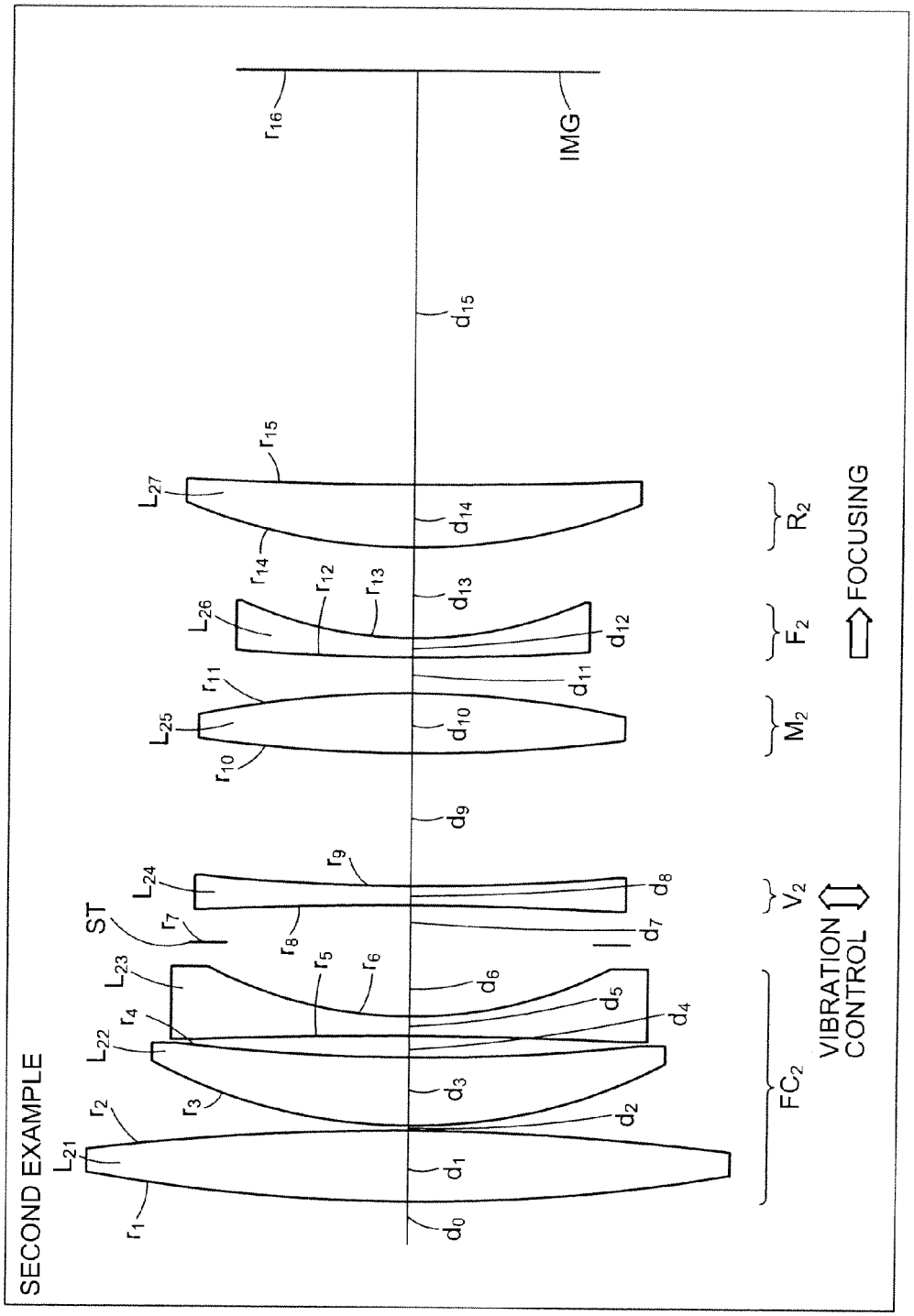
FIG. 6 is a cross sectional view (along the optical axis) of the fixed focus lens according to a second example.

FIG. 6 is a cross sectional view (along the optical axis) of the fixed focus lens according to a second example. The fixed focus lens includes a master group $M_2$ that has a positive refractive power, a focusing group $F_2$ that is disposed closer to the image plane IMG than the master group $M_2$ and that has a negative refractive power, a vibration control group $V_2$ that is disposed closer to the object (not depicted) than the master group $M_2$ and that has a negative refractive power, a front component group $FC_2$ that is disposed closer to the object than the vibration control group $V_2$ and that has a positive refractive power, and a rear group $R_2$ that is disposed closer to the image plane IMG than the focusing group $F_2$ and that has a positive refractive power. An aperture stop ST, which prescribes a given aperture, is disposed between the front component group $FC_2$ and the vibration control group $V_2$.

The front component group $FC_2$ includes sequentially from the object side a positive lens $L_{21}$, a positive lens $L_{22}$, and a negative lens $L_{23}$. The front component group $FC_2$ is fixed and does not move during focusing.

The vibration control group $V_2$ is configured by a negative lens $L_{24}$. The surface on the object side of the negative lens $L_{24}$ is aspheric and configured such that that convergence increases toward the periphery from an optical axial center. The vibration control group $V_2$ moves in a direction orthogonal to the optical axis, whereby vibration control is performed. The vibration control group $V_2$ does not move along the optical axis during focusing.

The master group $M_2$ is configured by a positive lens $L_{25}$. The master group $M_2$ is fixed and does not move during focusing.

The focusing group $F_2$ is configured by a negative lens $L_{26}$. The surface on the image plane IMG side of the negative lens $L_{26}$ is aspheric. The focusing group $F_2$ moves along the optical axis, from the object side toward the image plane IMG, whereby focusing from infinity focus to focus at the minimum object distance is performed.

The rear group $R_2$ is configured by a positive lens $L_{27}$.

Various values related to the fixed focus lens according to the second example are given below.

(Lens data)

| | | | |
|---|---|---|---|
| $r_0 = \infty$ (object surface) | $d_0 = D(0)$ | | |
| $r_1 = 56.0876$ | $d_1 = 2.9405$ | $nd_1 = 1.91082$ | $\upsilon d_1 = 35.25$ |
| $r_2 = -78.8540$ | $d_2 = 0.2000$ | | |
| $r_3 = 16.7672$ | $d_3 = 2.8306$ | $nd_2 = 1.91082$ | $\upsilon d_2 = 35.25$ |
| $r_4 = 60.4009$ | $d_4 = 0.8789$ | | |
| $r_5 = -153.1408$ | $d_5 = 0.8000$ | $nd_3 = 1.84666$ | $\upsilon d_3 = 23.78$ |
| $r_6 = 13.3861$ | $d_6 = 3.0125$ | | |
| $r_7 = \infty$ (aperture stop) | $d_7 = 1.6000$ | | |
| $r_8 = -123.5154$ (aspheric surface) | $d_8 = 0.8000$ | $nd_4 = 1.68893$ | $\upsilon d_4 = 31.16$ |
| $r_9 = 66.1879$ | $d_9 = 5.5404$ | | |
| $r_{10} = 48.1456$ | $d_{10} = 2.4968$ | $nd_5 = 1.91082$ | $\upsilon d_5 = 35.25$ |
| $r_{11} = -30.3615$ | $d_{11} = D(11)$ | | |
| $r_{12} = 69.7462$ | $d_{12} = 0.8000$ | $nd_6 = 1.68893$ | $\upsilon d_6 = 31.16$ |
| $r_{13} = 12.1678$ (aspheric surface) | $d_{13} = D(13)$ | | |
| $r_{14} = 18.1271$ | $d_{14} = 2.6381$ | $nd_7 = 1.72916$ | $\upsilon d_7 = 54.67$ |
| $r_{15} = 145.5896$ | $d_{15} = FB$ | | |
| $r_{16} = \infty$ (image plane) | | | |

(Constant of cone (k) and aspheric coefficients ($A_4, A_6, A_8, A_{10}$))

(Eighth plane)

k = 0,
$A_4 = 1.29983 \times 10^{-7}, A_6 = 8.66172 \times 10^{-8}$,
$A_8 = -1.05350 \times 10^{-9}, A_{10} = 1.64719 \times 10^{-11}$ (Thirteenth plane)

k = 0,
$A_4 = -1.93195 \times 10^{-5}, A_6 = -2.22932 \times 10^{-7}$,
$A_8 = 1.22482 \times 10^{-9}, A_{10} = -3.13255 \times 10^{-11}$ (Values for various focus states)

| | Infinity | 0.025x | Minimum Object Distance |
|---|---|---|---|
| Focal length of entire system (f) | 35.27 | 34.88 | 33.70 |
| F no. | 2.0 | 2.0 | 2.1 |
| Half angle of view ($\omega$) | 12.1 | 11.8 | 10.8 |
| D(0) (object to image distance) | $\infty$ | 1414.1 | 402.0 |
| D(11) | 1.5000 | 2.0830 | 3.5945 |
| D(13) | 3.7954 | 3.2115 | 1.7000 |
| FB (back focus) | 17.5280 | 17.5280 | 17.5280 |

(Values related to conditional expression (1))
$\Delta H$ (variation of the aspheric surface of vibration control group V2 from a base spherical curve, where the variation is at a point along the perimeter of the effective area demarcated by the effective radius (6.785) of aspheric surface and assumed to be positive in the direction of the image plane side)=(0.0074)

$1000 \times (\Delta H/f) = 0.21$ (Values related to conditional expression (2))
fV (focal length of vibration control group $V_2$)=-62.446
fF (focal length of focusing group $F_2$)=-21.516
fV/fF=2.90
(Values related to conditional expression (3))
$\beta$inf (paraxial magnification of focusing group $F_2$, at infinity focus)=3.986
$\beta$mod (paraxial magnification of focusing group $F_2$, at minimum object distance focus)=2.872
$\beta$inf/$\beta$mod=1.39
(Values related to conditional expression (4))
fM (focal length of master group $M_2$)=(20.757)
fM/f=0.59

Figure 7:
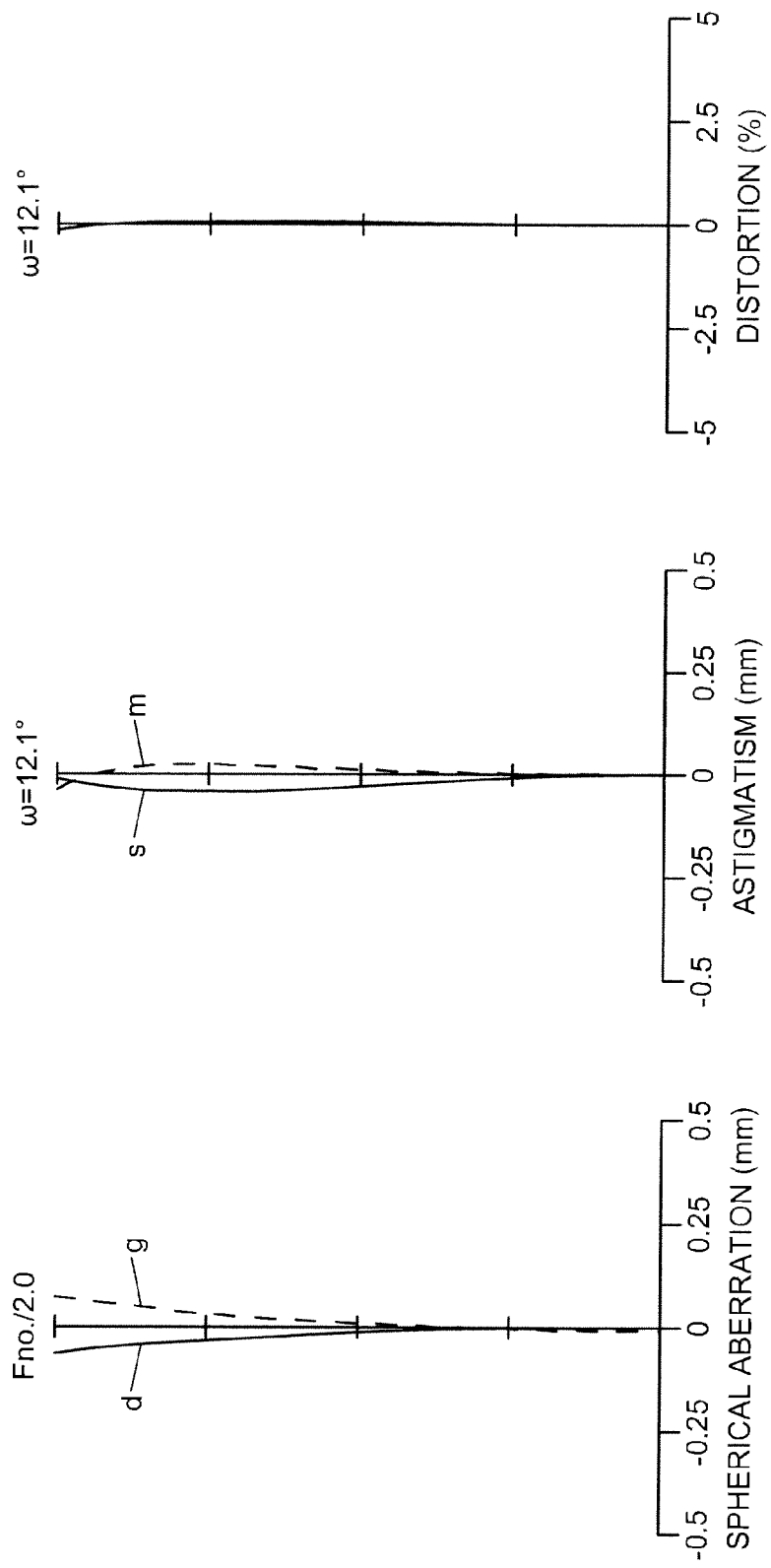
FIG. 7 is a diagram of various types of aberration of the fixed focus lens according to the second example, at infinity focus.
Figure 8:
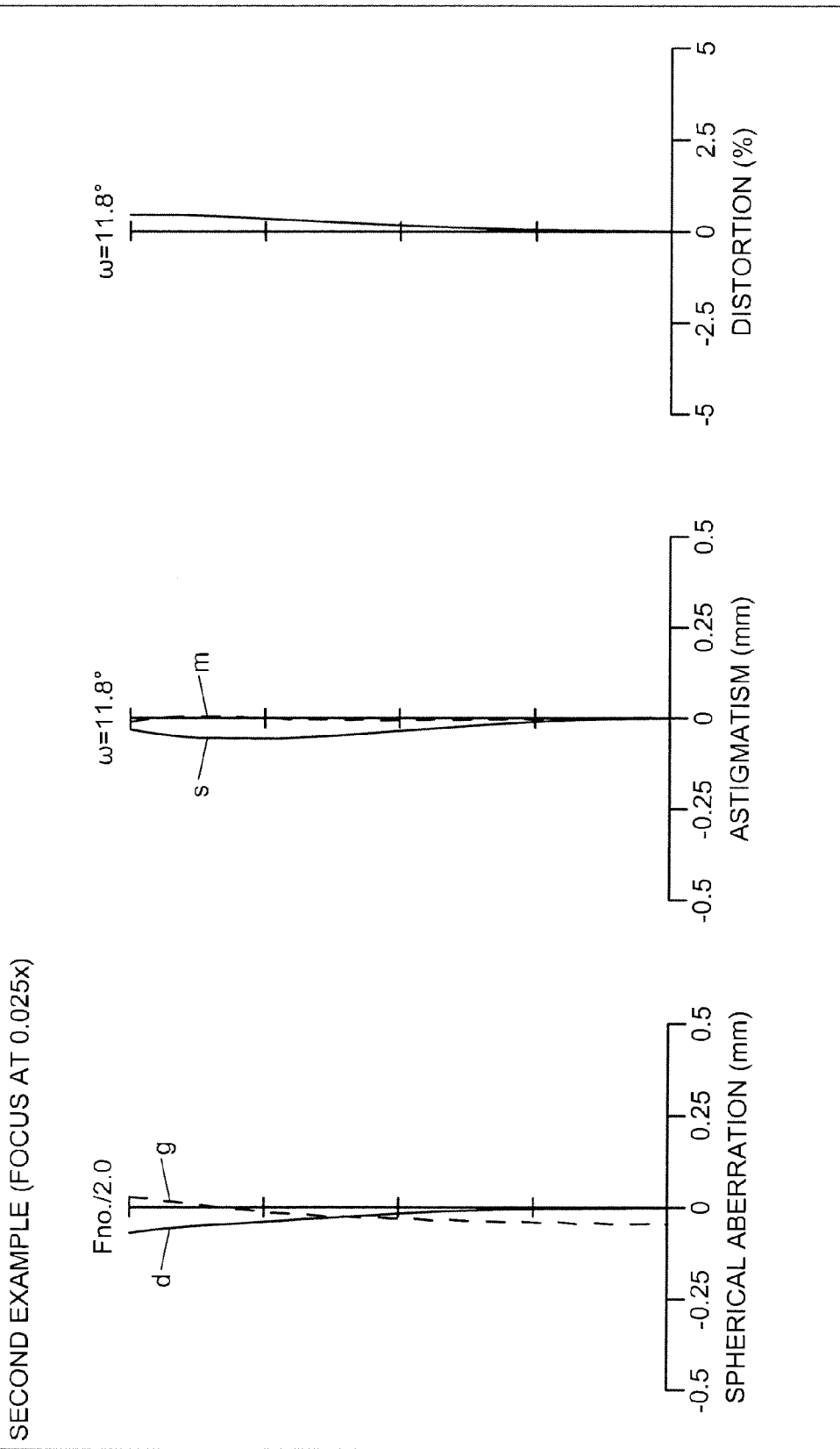
FIG. 8 is a diagram of various types of aberration of the fixed focus lens according to the second example, at the focus state for a magnification of 0.025×.
Figure 9:
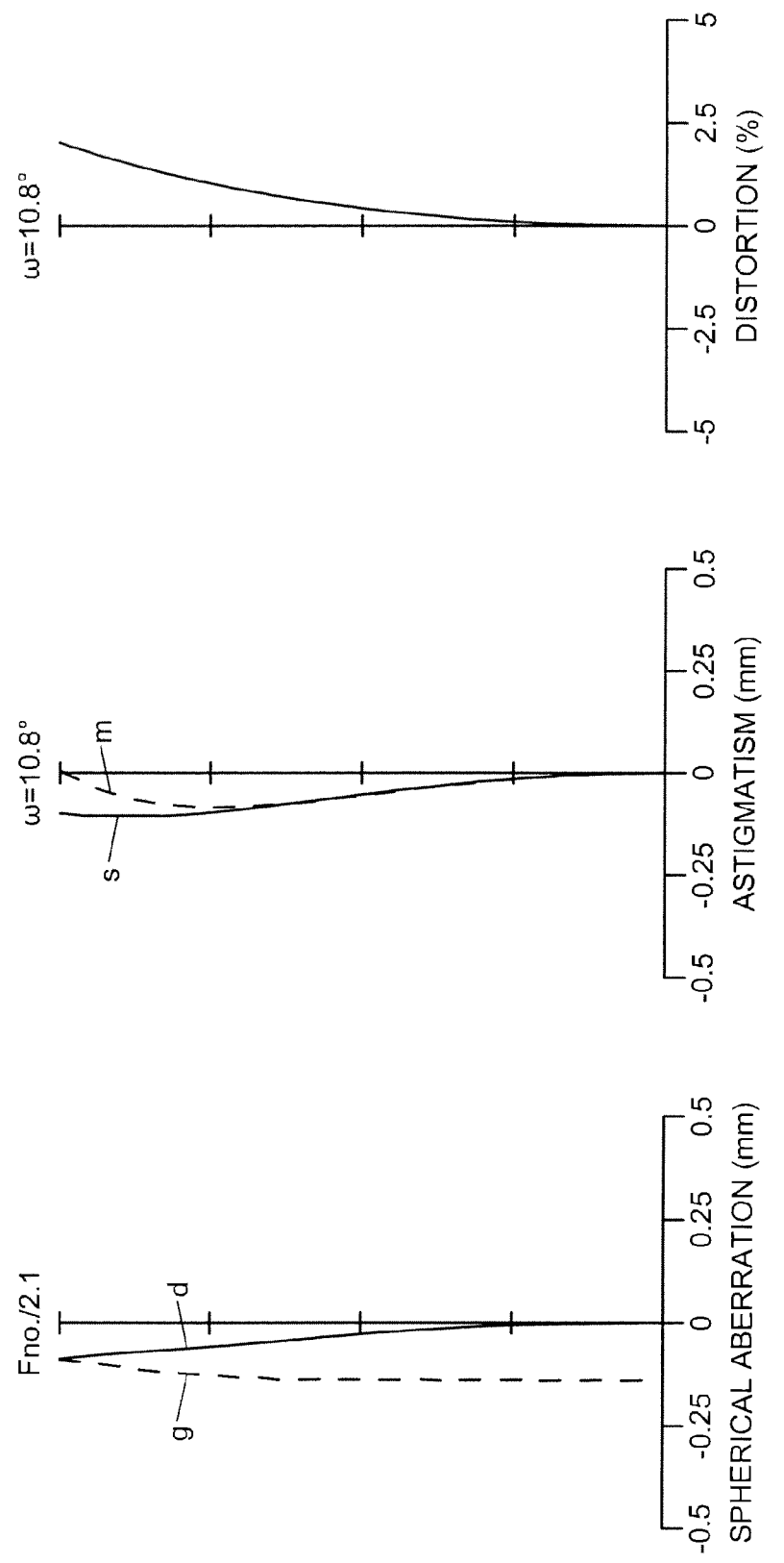
FIG. 9 is a diagram of various types of aberration of the fixed focus lens according to the second example, at focus state for the minimum object distance.
Figure 10:
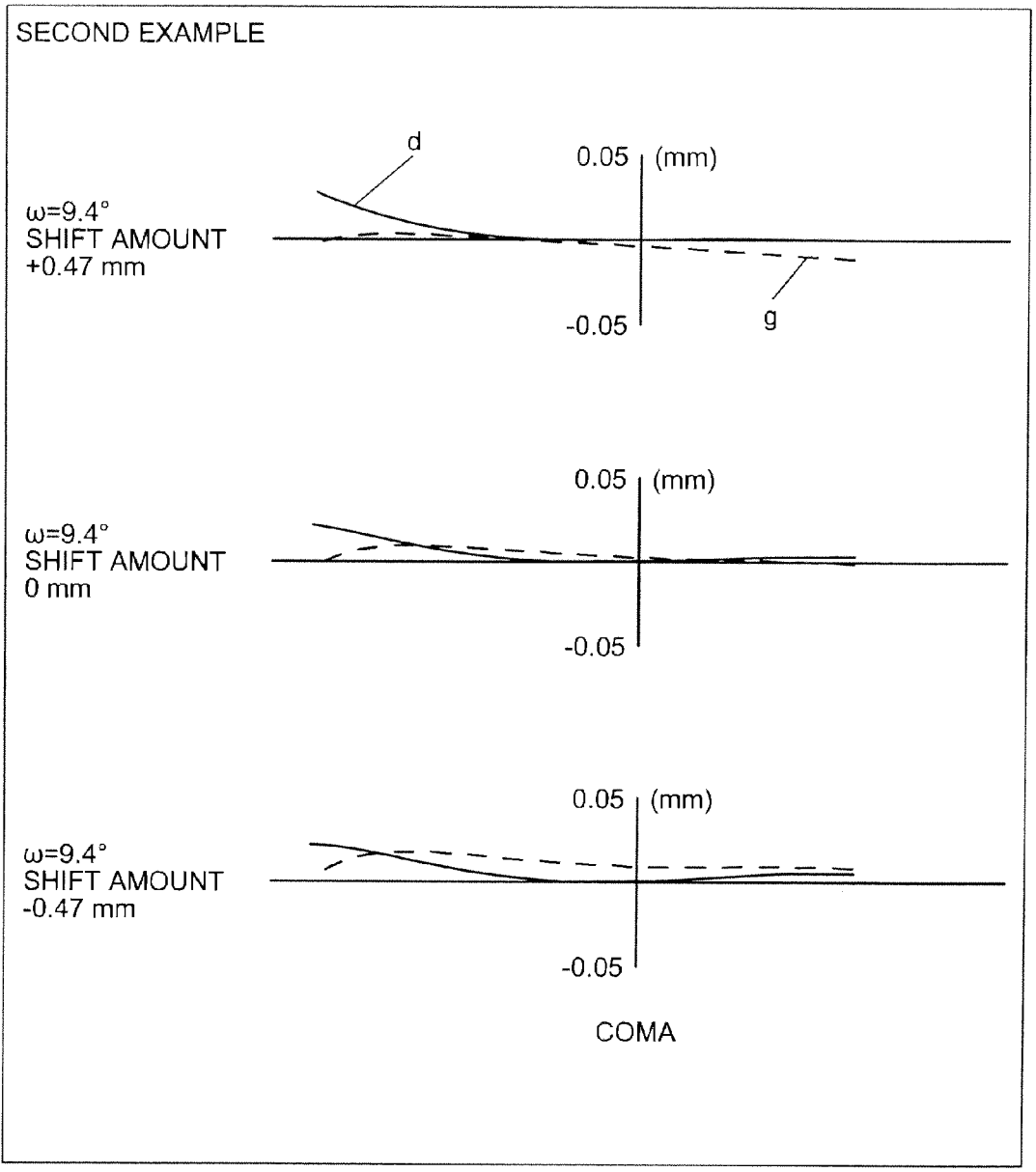
FIG. 10 is a diagram of coma of the fixed focus lens according to the first example, at various shift states of the vibration control group $V_2$.

FIG. 7 is a diagram of various types of aberration of the fixed focus lens according to the second example, at infinity focus. FIG. 8 is a diagram of various types of aberration of the fixed focus lens according to the second example, at the focus state for a magnification of 0.025x. FIG. 9 is a diagram of various types of aberration of the fixed focus lens according to the second example, at focus state for the minimum object distance. FIG. 10 is a diagram of coma of the fixed focus lens according to the first example, at various shift states of the vibration control group $V_2$. In the drawing, g depicts wavelength aberration corresponding to g-line ($\lambda$=435.83 nm) and d depicts wavelength aberration corresponding to d-line ($\lambda$=587.56 nm). Furthermore, in the drawing, s and m shown with respect to astigmatism, respectively indicate aberration at the sagittal image plane and at the meridonal image plane. In the diagram of coma, the shift amount is positive in the upward direction with respect to the optical axis.

Figure 11:
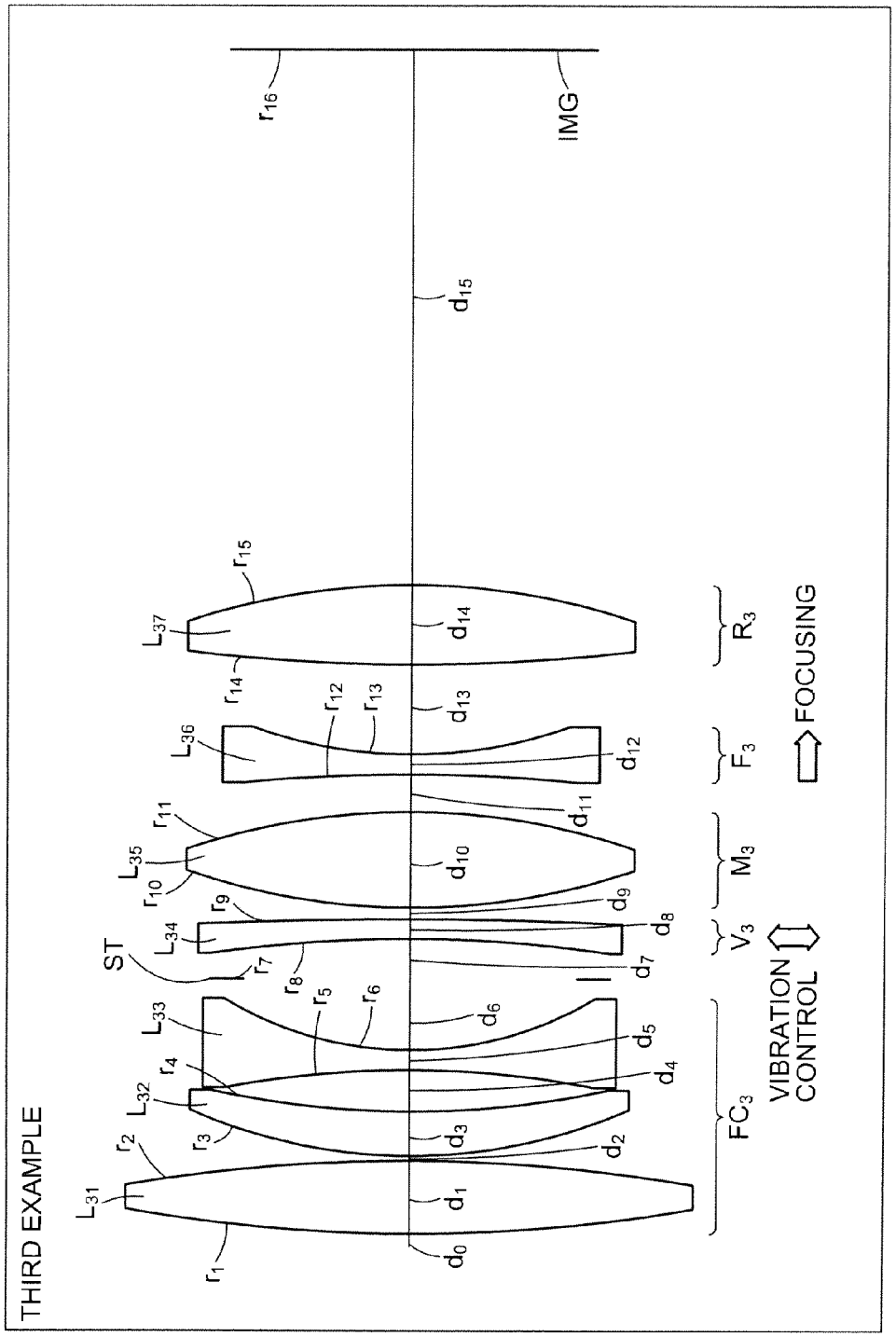
FIG. 11 is a cross sectional view (along the optical axis) of the fixed focus lens according to a third example.

FIG. 11 is a cross sectional view (along the optical axis) of the fixed focus lens according to a third example. The fixed focus lens includes a master group $M_3$ that has a positive refractive power, a focusing group $F_3$ that is disposed closer to the image plane IMG than the master group $M_3$ and that has a negative refractive power, a vibration control group $V_3$ that is disposed closer to the object (not depicted) than the master group $M_3$ and that has a negative refractive power, a front component group $FC_3$ that is disposed closer to the object than the vibration control group $V_3$ and that has a positive refractive power, and a rear group $R_3$ that is disposed closer to the image plane IMG than the focusing group $F_3$ and that has a positive refractive power. An aperture stop ST, which prescribes a given aperture, is disposed between the front component group $FC_3$ and the vibration control group $V_3$.

The front component group $FC_3$ includes sequentially from the object side, a positive lens $L_{31}$, a positive lens $L_{32}$, and a negative lens $L_{33}$. The front component group $FC_3$ is fixed and does not move during focusing.

The vibration control group $V_3$ is configured by a negative lens $L_{34}$. The surface on the object side of the negative lens $L_{34}$ is aspheric and configured such that that convergence increases toward the periphery from an optical axial center. The vibration control group $V_3$ moves in a direction orthogonal to the optical axis, whereby vibration control is performed. The vibration control group $V_3$ does not move along the optical axis during focusing.

The master group $M_3$ is configured by a positive lens $L_{35}$. The master group $M_3$ is fixed and does not move during focusing.

The focusing group $F_3$ is configured by a negative lens $L_{36}$. The focusing group $F_3$ moves along the optical axis, from the object side toward the image plane IMG, whereby focusing from infinity focus to focus at the minimum object distance is performed.

The rear group $R_3$ is configured by a positive lens $L_{37}$.

Various values related to the fixed focus lens according to the third example are given below.

(Lens data)

| | | | |
|---|---|---|---|
| $r_0 = \infty$ (object surface) | $d_0 = D(0)$ | | |
| $r_1 = 53.7846$ | $d_1 = 2.9122$ | $nd_1 = 1.91082$ | $\upsilon d_1 = 35.25$ |
| $r_2 = -54.7799$ | $d_2 = 0.2000$ | | |
| $r_3 = 18.0573$ | $d_3 = 1.7681$ | $nd_2 = 1.91082$ | $\upsilon d_2 = 35.25$ |
| $r_4 = 31.2689$ | $d_4 = 1.6294$ | | |
| $r_5 = -32.9967$ | $d_5 = 0.8000$ | $nd_3 = 1.70620$ | $\upsilon d_3 = 29.22$ |
| $r_6 = 12.0203$ | $d_6 = 2.8263$ | | |
| $r_7 = \infty$ (aperture stop) | $d_7 = 1.6000$ | | |
| $r_8 = -46.3200$ (aspheric surface) | $d_8 = 0.8000$ | $nd_4 = 1.83949$ | $\upsilon d_4 = 23.98$ |
| $r_9 = -153.1652$ | $d_9 = 0.4370$ | | |
| $r_{10} = 22.4845$ | $d_{10} = 3.8389$ | $nd_5 = 1.74564$ | $\upsilon d_5 = 51.53$ |
| $r_{11} = -22.6890$ | $d_{11} = D(11)$ | | |
| $r_{12} = -57.6585$ | $d_{12} = 0.8000$ | $nd_6 = 1.58144$ | $\upsilon d_6 = 40.89$ |
| $r_{13} = 15.4524$ | $d_{13} = D(13)$ | | |
| $r_{14} = 58.8737$ | $d_{14} = 3.2150$ | $nd_7 = 1.72916$ | $\upsilon d_7 = 54.67$ |
| $r_{15} = -22.7664$ | $d_{15} = FB$ | | |
| $r_{16} = \infty$ (image plane) | | | |

-continued (Constant of cone (k) and aspheric coefficients ($A_4, A_6, A_8, A_{10}$))
(Eighth plane)

$k = 0, A_4 = 1.00000 \times 10^{-6}, A_6 = 1.00000 \times 10^{-8},$
$A_8 = -7.00000 \times 10^{-10}, A_{10} = 1.00000 \times 10^{-11}$ (Values for various focus states)

| | Infinity | 0.025x | Minimum Object Distance |
|---|---|---|---|
| Focal length of entire system (f) | 30.00 | 30.07 | 30.05 |
| F no. | 2.0 | 2.0 | 2.1 |
| Half angle of view (ω) | 15.7 | 15.3 | 14.6 |
| D(0) (object to image distance) | ∞ | 1215.0 | 402.0 |
| D(11) | 1.5000 | 2.1225 | 3.4139 |
| D(13) | 3.6140 | 2.9915 | 1.7000 |
| FB (back focus) | 21.4268 | 21.4268 | 21.4268 |

(Values related to conditional expression (1))
ΔH (variation of the aspheric surface of vibration control group V3 from a base spherical curve, where the variation is at a point along the perimeter of the effective area demarcated by effective radius (6.723) of aspheric surface and assumed to be positive in the direction of the image plane side)=(0.0019)

1000×(ΔH/f)=0.06

(Values related to conditional expression (2))
fV (focal length of vibration control group $V_3$)=−79.368
fF (focal length of focusing group $F_3$)=−20.875
fV/fF=3.80
(Values related to conditional expression (3))
βinf (paraxial magnification of focusing group $F_3$, at infinity focus)=26.952
βmod (paraxial magnification of focusing group $F_3$, at minimum object distance focus)=7.765
βinf/βmod=3.47
(Values related to conditional expression (4))
fM (focal length of master group $M_3$)=(15.716)
fM/f=0.52

Figure 12:
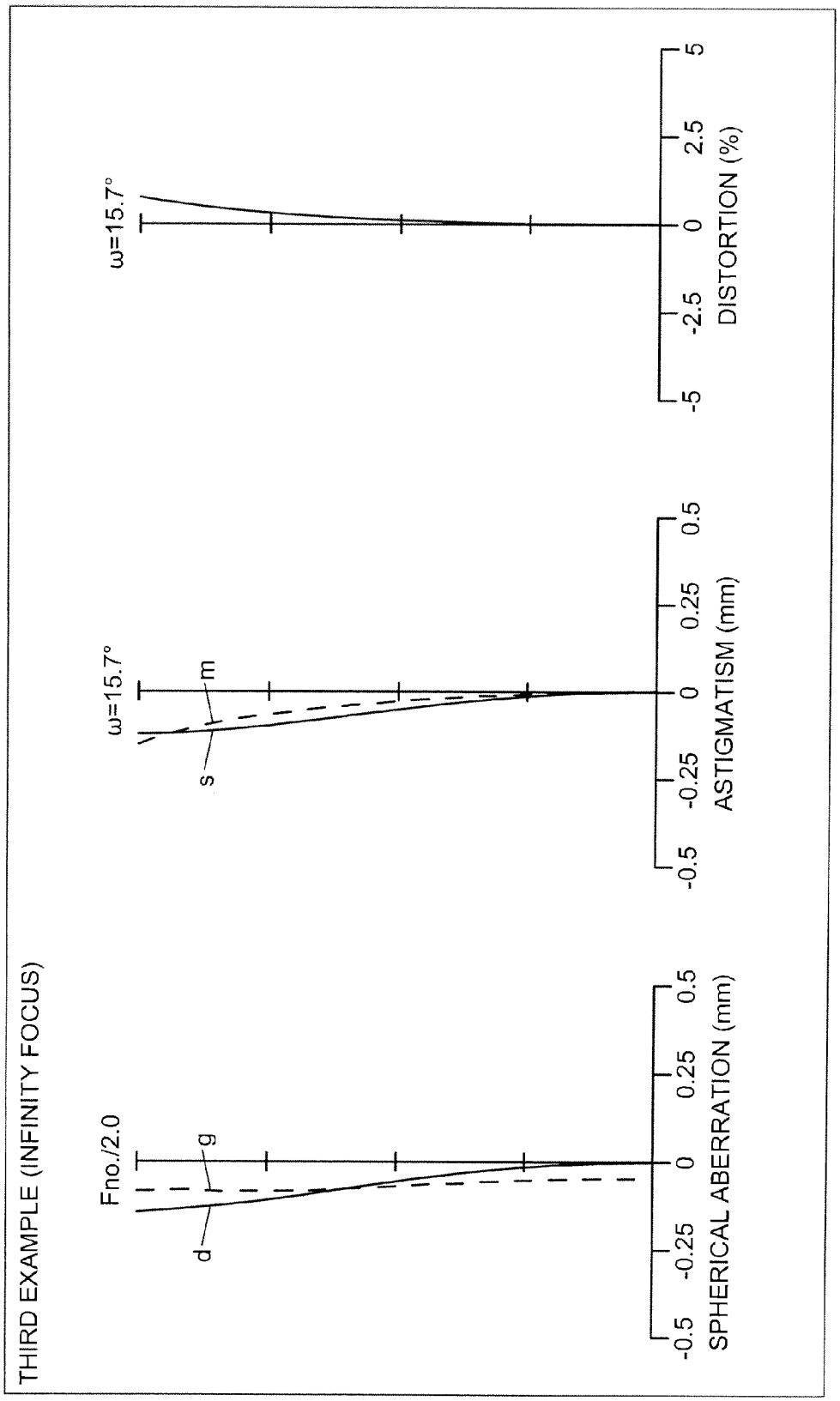
FIG. 12 is a diagram of various types of aberration of the fixed focus lens according to the third example, at infinity focus.
Figure 13:
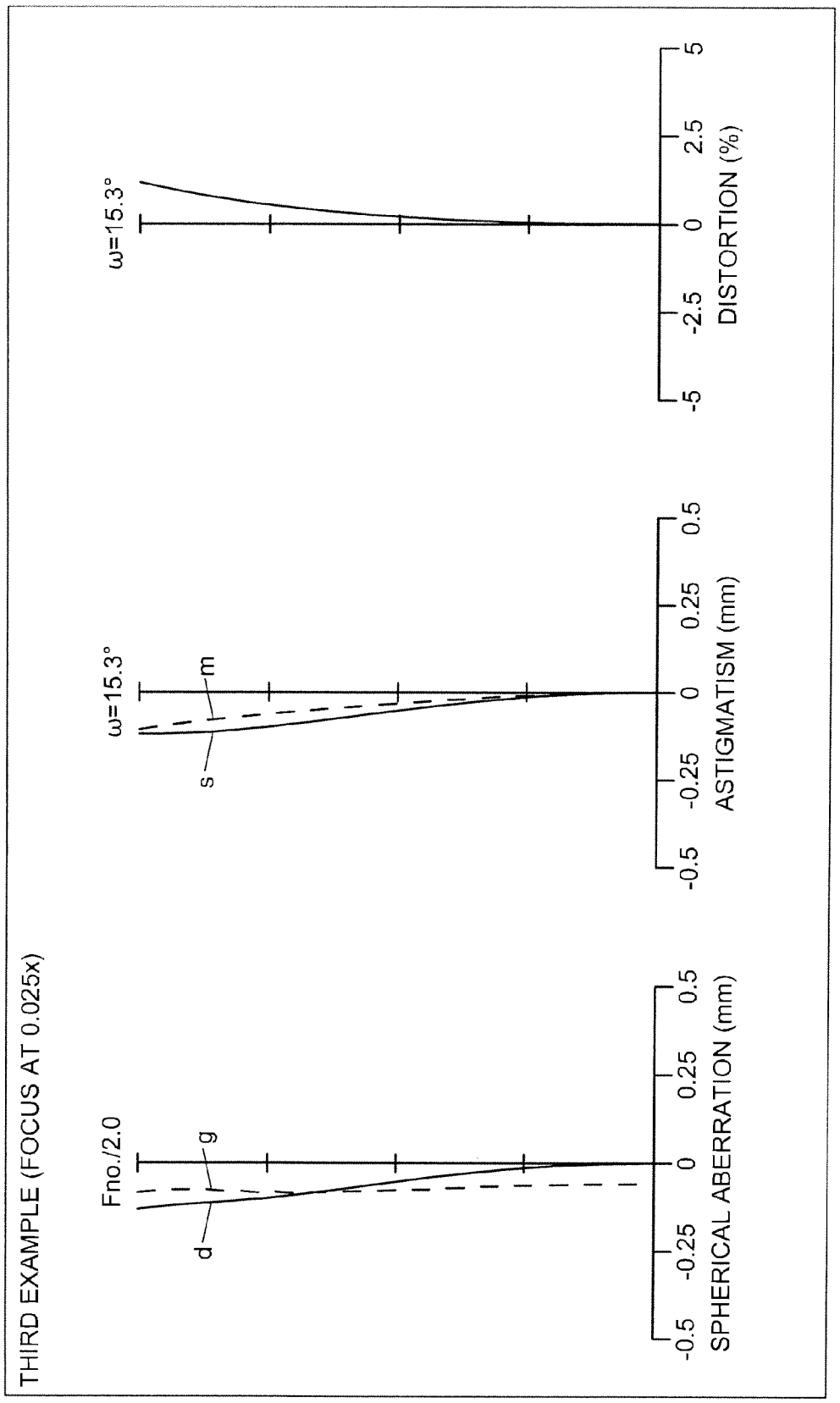
FIG. 13 is a diagram of various types of aberration of the fixed focus lens according to the third example, at the focus state for a magnification of 0.025×.
Figure 14:
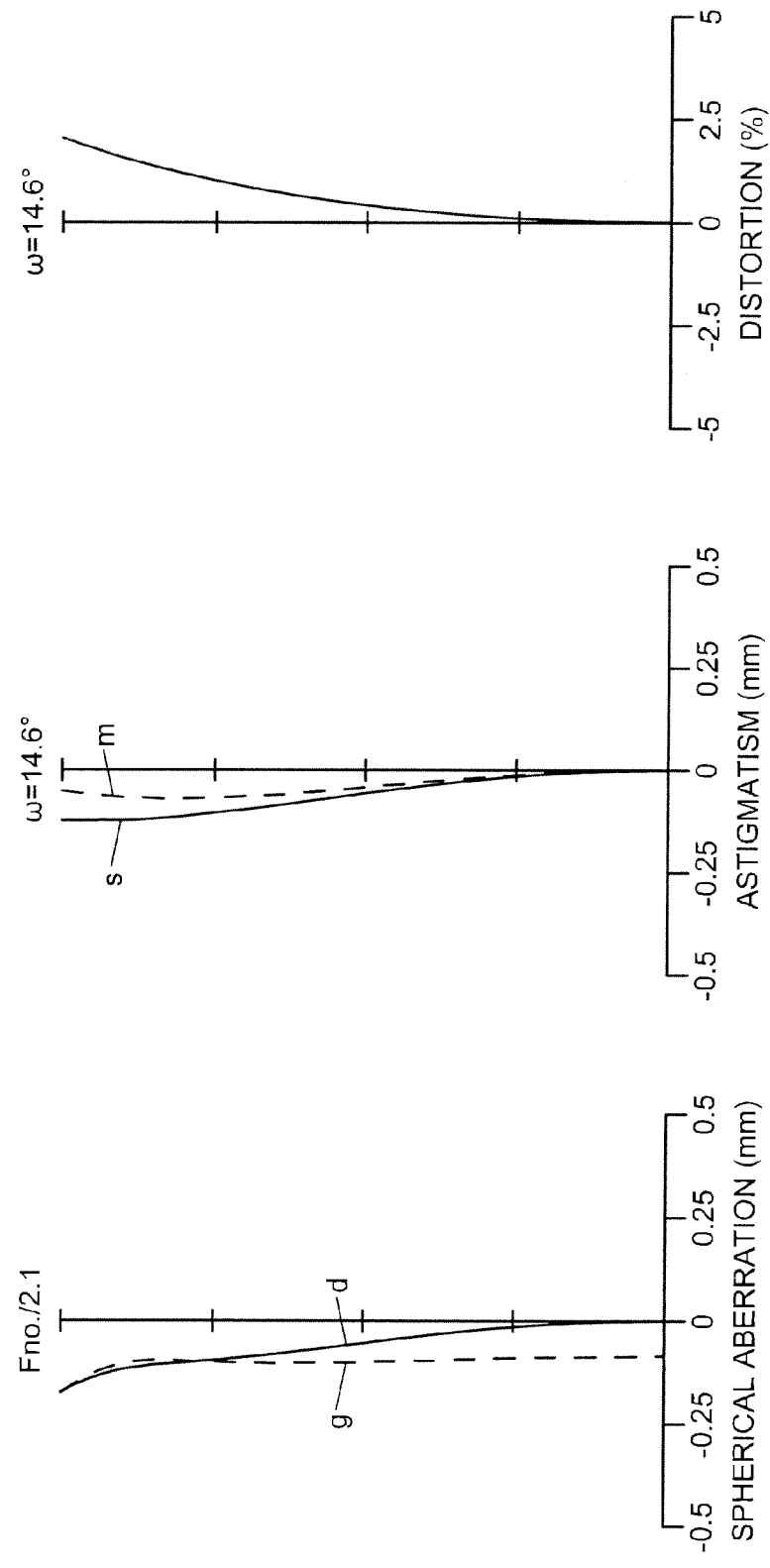
FIG. 14 is a diagram of various types of aberration of the fixed focus lens according to the second example, at focus state for the minimum object distance.
Figure 15:
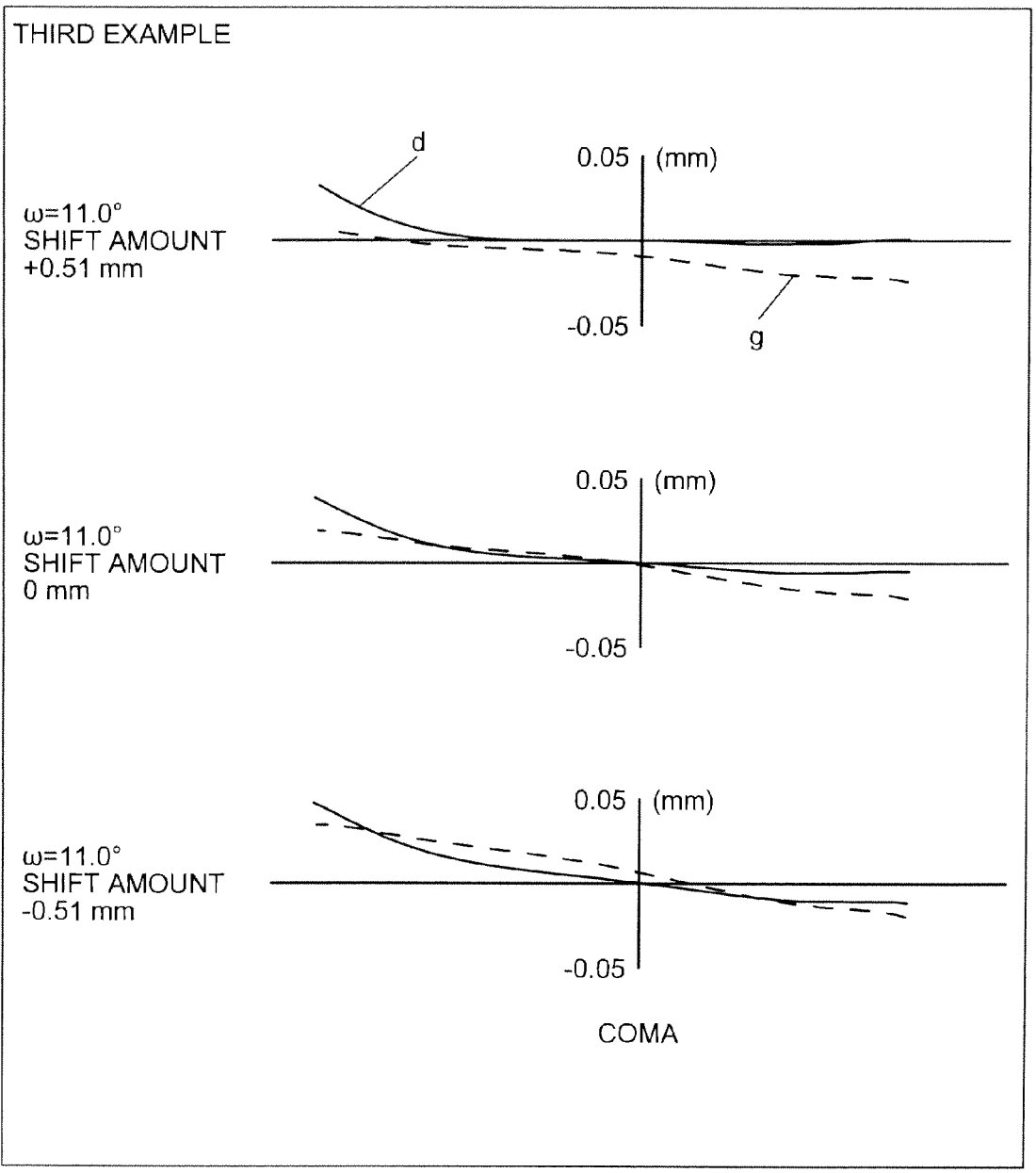
FIG. 15 is a diagram of coma of the fixed focus lens according to the first example, at various shift states of the vibration control group $V_3$.

FIG. 12 is a diagram of various types of aberration of the fixed focus lens according to the third example, at infinity focus. FIG. 13 is a diagram of various types of aberration of the fixed focus lens according to the third example, at the focus state for a magnification of 0.025×. FIG. 14 is a diagram of various types of aberration of the fixed focus lens according to the second example, at focus state for the minimum object distance. FIG. 15 is a diagram of coma of the fixed focus lens according to the first example, at various shift states of the vibration control group $V_3$. In the drawing, g depicts wavelength aberration corresponding to g-line (λ=435.83 nm) and d depicts wavelength aberration corresponding to d-line (λ=587.56 nm). Furthermore, in the drawing, s and m shown with respect to astigmatism, respectively indicate aberration at the sagittal image plane and at the meridonal image plane. In the diagram of coma, the shift amount is positive in the upward direction with respect to the optical axis.

Among the values for each of the examples above, $r_1$, $r_2$, . . . indicate radii of curvature for each lens, diaphragm surface, etc.; $d_1$, $d_2$ . . . indicate the thickness of the lenses, diaphragm, etc. or the distance between surfaces thereof; $nd_1$, $nd_2$, . . . indicate the refraction index of each lens with respect to the d-line (λ=587.56 nm); and $\upsilon d_1$, $\upsilon d_2$, . . . indicate the Abbe number with respect to the d-line (λ=587.56 nm). Lengths are indicated in units of [mm] and angles are indicated in [degrees].

Each aspheric surface shape above is expressed by equation [1], where Z is the depth of the aspheric surface, c is curvature (=1/r: radius of curvature), h is the height from the optical axis, and the travel direction of light is positive.

$$Z = ch^2/[1+\{1-(1+k)c^2h^2\}^{1/2}] + A_4 h^4 + A_6 h^6 + A_8 h^8 + A_{10} h^{10} \quad [1]$$

Where, k is the constant of the cone, and $A_4$, $A_6$, $A_8$, and $A_{10}$ are the fourth, sixth, eighth, and tenth order aspheric coefficients.

As described, in the fixed focus lens according to each of the examples, the focusing group and the vibration control group are configured by compact and lightweight lenses and other lens groups as well are configured by few lenses, meanwhile high imaging performance can be achieved. In particular, by satisfying the conditional expressions above, the fixed focus lens becomes more compact and has excellent imaging performance. Further, the fixed focus lens uses lenses having suitable aspheric surfaces, enabling favorable optical performance to be maintained with fewer lenses.

As described, the fixed focus lens according to the present invention is applicable to 35 mm cameras, video cameras, electronic still cameras, etc. and is particularly suitable for mirrorless single-lens cameras having a short back focus.

According to the present invention, a fixed focus lens having a compact, lightweight vibration control group and incorporating an internal focusing scheme that offer high imaging performance is realized.

The present invention improves the imaging performance of the optical system with sacrifice to the compact size of the optical system and facilitates a lightweight focusing group. The present invention reduces the minimum object distance and improves imaging performance.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-050781 filed in Japan on Mar. 8, 2011.

What is claimed is:

1. A fixed focus lens comprising, sequentially from an object side:
    an FC group having a positive refractive power;
    a V group having a negative refractive power, and being moved in a direction orthogonal to an optical axis during vibration control;
    an M group having a positive refractive power; and
    an F group having a negative refractive power, and being moved along the optical axis during focusing;
    the V group is configured by a single lens element, and
    during focusing, at least the FC group and the M group are fixed.

2. The fixed focus lens according to claim 1, wherein
    the single lens element of the V group has at least one aspheric surface configured such that convergence increases toward a periphery from an optical axial center, and
    a conditional expression (1) 0.04≤1000×(αH/f)≤0.5 is satisfied, where ΔH is a variation of the aspheric surface from a base spherical curve, where the variation is at a point along a perimeter of an effective area demarcated by an effective radius of the aspheric surface and is positive in a direction of an image plane side, and f is an overall focal length of the fixed focus lens.

3. The fixed focus lens according to claim 1, wherein a conditional expression (2) 1.5≤fV/fF≤6.2 is satisfied, where fV is a focal length of the V group and fF is a focal length of the F group.

4. The fixed focus lens according to claim 1, wherein the F group is configured by a single lens element.

5. The fixed focus lens according to claim 1, wherein a conditional expression (3) 0.8βinf/βmod≤7.0 is satisfied, where βinf is a paraxial magnification of the F group, at infinity focus and βmod is a paraxial magnification of the F group, at a focus state at a minimum object distance.

6. The fixed focus lens according to claim 1, wherein a conditional expression (4) 0.36≤fM/f≤0.77 is satisfied, where fM is a focal length of the M group and f is an overall focal length of the fixed focus lens.

* * * * *